No. 859,079. PATENTED JULY 2, 1907.
E. KEMPSHALL.
METHOD OF MAKING TIRES.
APPLICATION FILED MAR. 27, 1906. RENEWED MAY 9, 1907.
3 SHEETS—SHEET 1.
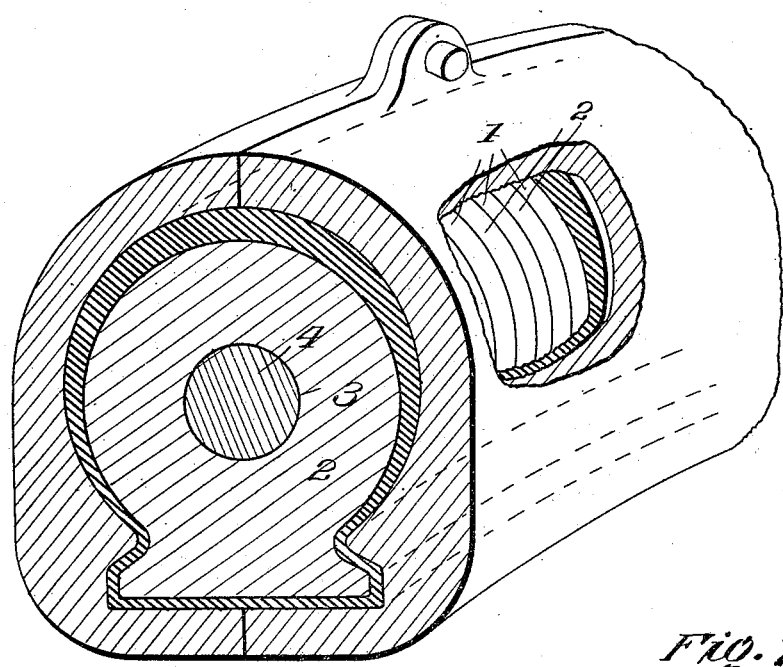
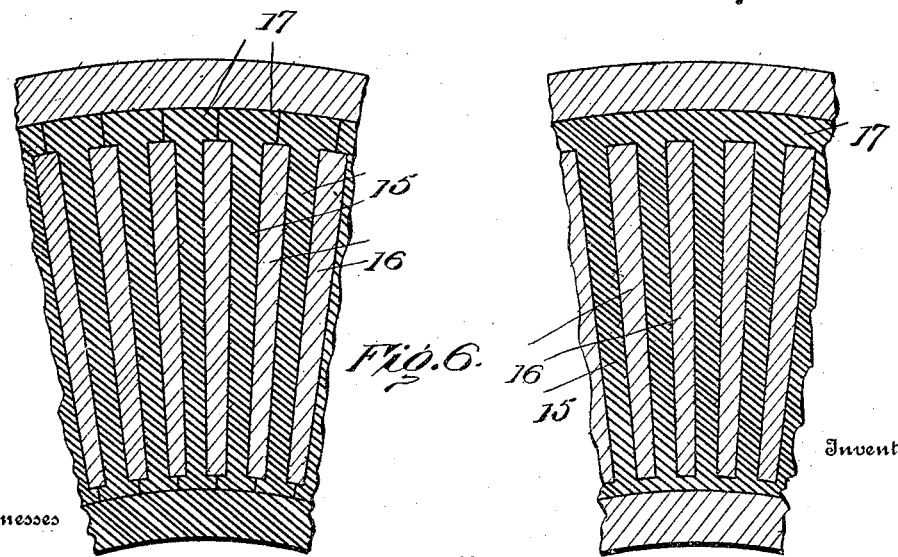

No. 859,079. PATENTED JULY 2, 1907.
E. KEMPSHALL.
METHOD OF MAKING TIRES.
APPLICATION FILED MAR. 27, 1906. RENEWED MAY 9, 1907.
3 SHEETS—SHEET 2.
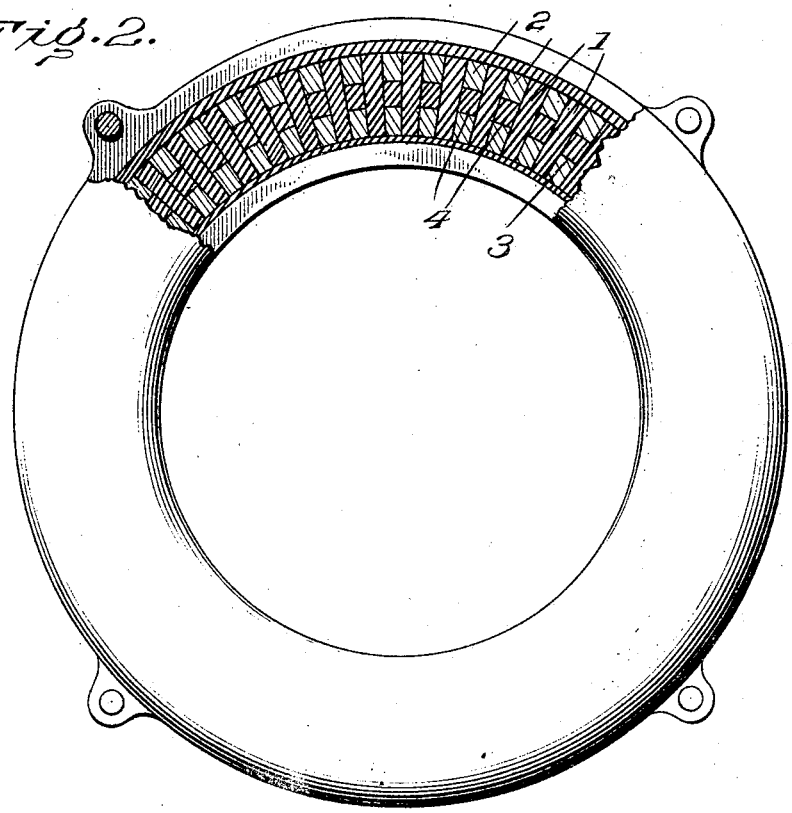
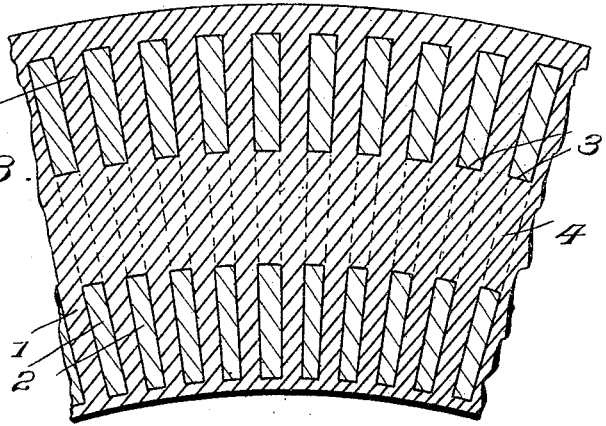

No. 859,079. PATENTED JULY 2, 1907.
E. KEMPSHALL.
METHOD OF MAKING TIRES.
APPLICATION FILED MAR. 27, 1906. RENEWED MAY 9, 1907.
3 SHEETS—SHEET 3.
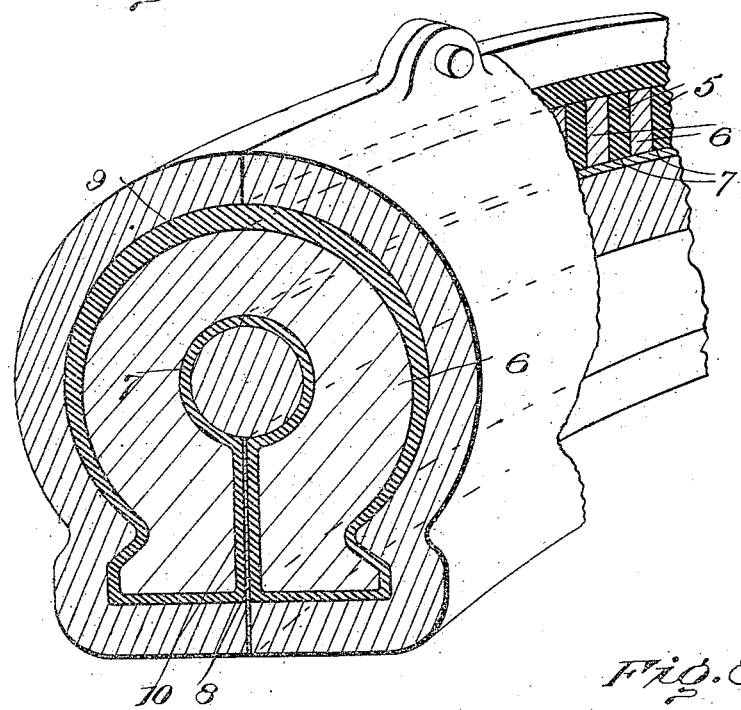
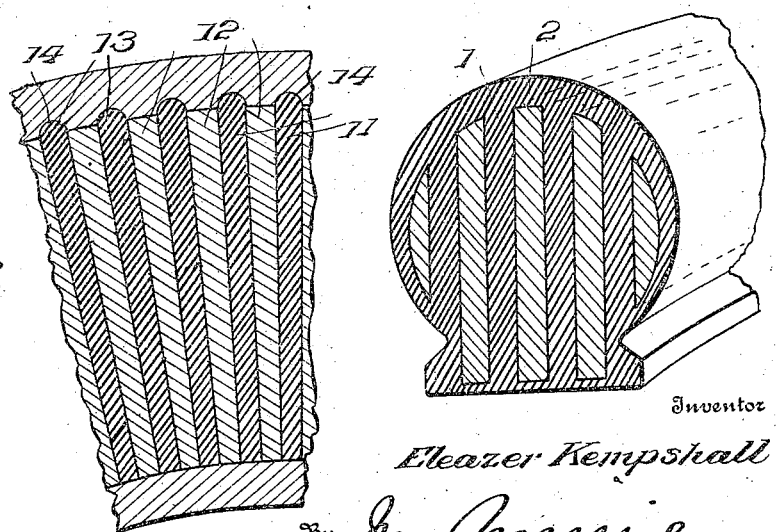
Inventor
Eleazer Kempshall

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

METHOD OF MAKING TIRES.

No. 859,079.

Specification of Letters Patent.

Patented July 2, 1907.

Application filed March 27, 1906. Renewed May 9, 1907. Serial No. 372,767.

*To all whom it may concern:*

Be it known that ELEAZER KEMPSHALL, a citizen of the United States, residing at Boston, in the county of Suffolk and State of Massachusetts, has invented certain new and useful Improvements in Methods of Making Tires, of which the following is a specification.

The invention relates to an improved method of making vehicle tires, having particular regard to the economic production of a tire of the resilient type, which shall be exceedingly durable and lasting in use.

In carrying out the process, the main features include the construction of a tire made up of sections of materials of varying degrees of resiliency and resistance to wear, and treating the tire so constructed in a manner to form in effect an integral whole.

The sections forming the tire construction may be assembled in various ways to provide tires of relatively different types, and the preferred sectional constructions used in the present process are clearly shown in the accompanying drawings, in which—

Figure 1 is a broken perspective view of a tire showing one form of arranging the respective sections. Fig. 2 is a longitudinal section of the same, prior to the final step of the process. Fig. 3 is a similar view of the completed tire. Fig. 4 is a broken perspective, partly in longitudinal section, showing a second form of section-construction. Fig. 5 is a longitudinal section of a tire involving another form of section-arrangement. Fig. 6 is a longitudinal section of a tire, showing another form of section arrangement. Fig. 7 is a similar view showing the tire illustrated in Fig. 6 after the final step in the process. Fig. 8 is a different form of tire formed by my improved process.

As a basic statement of the present process I construct a tire of transversely-arranged sections of materials of different degrees of resiliency and durability, as rubber and leather, which sections are disposed alternately throughout the length of the tire, with their contacting faces initially secured together, as by cementing, or the like. The tire thus formed is submitted to a fusing process, such as vulcanizing, with the effect to fuse or secure the sections to practically an integral whole.

In Figs. 1 to 3, inclusive, the sections of material are of an outline corresponding to the shape desired for the completed tire, the rubber, or similar sections of vulcanizable material 1, being of solid formation, while the leather, or similar sections 2, are each formed into a centrally-arranged transversely-disposed opening 3, which may be of any size desired. In initially assembling the sections in this construction, plugs 4, of rubber or other material to be affected by the final step in the process, are inserted in the openings 3, with their ends in contact with the adjacent sections of rubber. In subjecting the tire of this form to the final or vulcanizing step, the plugs 4—4, will integrally unite with the adjacent rubber sections 1, giving the completed tire the construction shown in Fig. 3.

In Fig. 4, the resilient sections of vulcanizable material 5, and relatively non-resilient sections 6, are of identical form, being each formed with a central opening 7, and divided at their lower portions at 8, forming the conventional type of tire. The outer surfaces or edges of the sections are inclosed in an envelop 9, with a lining 10, also covering the edges of the sections within the opening 7. The envelop may be of any sectional construction, though preferably thickest at the tread portion, and said envelop and lining may be of one integral strip. In subjecting this form of tire to the final step of the process, the envelop and lining will fuse with the sections 5, forming an integral construction, as will be obvious.

In Fig. 5, the resilient sections of material 11, and non-resilient sections of material 12, are of identical construction with the exception that the resilient sections project slightly beyond the non-resilient sections at the tread portion of the tire. These projections 13, may extend any distance throughout the transverse circumferential dimension of the tire, though preferably limited to the tread portion thereof. The sections of material in this form are of solid formation, and terminate in alinement at their inner edges to provide for an even bearing on the wheel-rim. In finally treating the tire of this form, the sections are vulcanized as previously described, care being taken to avoid destroying the projections 13, for which purpose the vulcanizing chamber is preferably formed with notches 14, to receive the depressions during the vulcanizing process.

The form of the tire shown in Figs. 6 and 7, is somewhat similar to that shown in Fig. 5, except that in this instance the resilient sections of vulcanizable material 15, are of greater area throughout than the non-resilient sections of material 16, so as to provide a portion 17, projecting from the resilient sections, beyond the non-resilient section, throughout the entire edge of the latter. In subjecting this form of tire to the final step the vulcanizing chamber must be of a size but slightly greater than the diameter of the non-resilient sections of material, so that the projecting portions 17, of the resilient sections of material will be flattened and forced toward each other, and over the edges of the intermediate non-resilient sections of material. When vulcanized projections of the adjacent resilient sections of material become in effect integral, thereby providing a strip integral with the resilient sections and overlying and inclosing the non-resilient sections.

It is to be particularly noted that the final step of the present process forms an integral interbinding of the sections of material, so that the resilient sections of material, in all forms described, are braced and reinforced by the non-resilient sections of material. The sections of material may be of any thickness or contour, and other material than rubber and leather may be employed, though such are preferred. The vulcanizing step referred to is intended to cover any step, mechanical or chemical, that will secure the necessary fusing between the sections.

The tire described and shown is of the cushion type, which owing to the high degree of resiliency imparted by my process of construction, is practically as effective as the usual pneumatic type, without, of course, being subjected to the disadvantages of the latter. The relatively non-resilient sections of material increase the durability of the tire without interfering with its resiliency, owing primarily to the relative arrangement of the sections of material and their interconnection in the process.

In Fig. 8, the resilient and non-resilient sections are annular in formation, but the mode of treatment with my improved process is substantially the same as that heretofore described.

I desire it to be understood that the terms envelop, lining, or incasing, used in the claims include a separate resilient covering for the sections, or fusing the edges of the resilient sections of material to form the covering.

What I claim is—

1. The herein-described process of constructing vehicle tires, consisting in assembling in tire form a series of transversely-arranged sections of material of different degrees of resiliency, and fusing said sections of material in place.

2. The herein described process of constructing vehicle tires, consisting in assembling in tire form a series of sections of rubber and leather and vulcanizing the whole.

3. The herein-described process of constructing vehicle tires, consisting in assembling in tire form a series of sections of rubber and leather arranged transverse the length of the tire, and vulcanizing the whole.

4. The herein-described process of constructing vehicle tires, consisting in assembling and alternately disposing in tire form rubber and leather, and vulcanizing the whole.

5. The herein-described process of constructing vehicle tires, consisting in assembling in tire form and alternately disposing transverse its length a series of sections of rubber and leather and vulcanizing the whole.

6. The herein-described process of constructing vehicle tires, consisting in assembling in tire form a series of sections of rubber and perforated sections of leather, disposing plugs of rubber in the perforations in the leather sections and vulcanizing the whole.

7. The herein-described process of constructing vehicle tires, consisting in assembling in tire form resilient sections of vulcanizable material, and perforated sections of non-resilient material, placing plugs of vulcanizable resilient material in the perforations of the non-resilient sections of material, and vulcanizing the whole.

8. The herein-described process of constructing vehicle tires, consisting in assembling in tire form solid sections of rubber and perforate sections of leather, disposing rubber plugs in the perforations in the leather sections, and vulcanizing the whole.

9. The herein-described process of constructing vehicle tires, consisting in assembling and alternately disposing in tire form solid sections of rubber and centrally perforate sections of leather, disposing lugs in the perforations in the leather sections and vulcanizing the whole.

10. The herein-described process of constructing vehicle tires, consisting in assembling in tire form non-resilient sections of material of less height than resilient sections of vulcanizing material, and vulcanizing the whole and maintaining the original size of the non-resilient sections.

11. The herein-described process of constructing vehicle tires, consisting in assembling and alternately disposing in tire form sections of rubber and sections of leather of less height than the rubber sections and vulcanizing the whole to maintain the projections of the rubber sections beyond the leather sections.

12. The herein-described process of constructing vehicle tires, consisting in assembling in tire form rubber sections and relatively reduced leather sections, and vulcanizing the whole to unite the projecting portions of the respective rubber sections.

13. The herein-described process of constructing vehicle tires, consisting in assembling and alternately disposing in tire form, rubber sections and relatively reduced leather sections, and vulcanizing the whole to integrally unite the projecting portions of the adjacent rubber sections.

14. The herein-described process of constructing vehicle tires, consisting in assembling and alternately disposing in tire form, rubber sections and relatively reduced leather sections, and vulcanizing the whole to integrally unite the projecting portions of the adjacent rubber sections to completely inclose the edges of the intermediate leather sections.

15. The herein-described process of constructing vehicle tires, consisting in assembling in tire form, a series of leather and rubber sections, inclosing the edges of the sections in a resilient envelop, and vulcanizing the whole.

16. The herein-described process of constructing vehicle tires, consisting in assembling in tire form, a series of leather and rubber sections each formed with a central perforation, inclosing the outer edges of the sections in an envelop, inclosing the inner edges of the sections in a lining, and fusing the whole.

17. The herein-described process of constructing tires, consisting in assembling in tire form a series of transversely arranged resilient sections of vulcanizable material interposed between the strengthening sections of material and uniting the sections by heating the assembled tire form.

18. The herein-described process of constructing tires, consisting in assembling in tire form a series of sections of resilient vulcanizable material interposed between sections of strengthening material, arranging them transversely to the direction of the tire, and vulcanizing the resilient sections of material to incase the strengthening sections of material.

19. The herein-described process of constructing tires, consisting in assembling and cementing together in tire form a series of transversely arranged resilient vulcanizable sections and interposed strengthening sections, and vulcanizing the tire to form and connect the resilient sections.

20. The herein-described process of constructing tires, consisting in assembling a series of sections of resilient vulcanizable material interposed between sections of strengthening material of less area than the resilient sections, and vulcanizing the resilient sections to incase the strengthening sections.

21. The herein-described process of constructing tires, consisting in assembling and cementing with rubber cement a series of sections of transversely arranged resilient vulcanizable material and interposed strengthening sections of material, and vulcanizing the resilient sections.

22. The herein-described process of constructing tires, consisting in assembling in tire form a series of sections of resilient vulcanizable material interposed between strengthening sections of leather, and vulcanizing the resilient sections of material when assembled with the strengthening sections of leather.

In testimony whereof I have signed my name to this specification in the presence of two subscribing witnesses.

ELEAZER KEMPSHALL.

Witnesses:
ELIZABETH L. MACFATE,
JNO. IMIRIE.